United States Patent
Rangaprasad et al.

(10) Patent No.: US 9,036,469 B2
(45) Date of Patent: May 19, 2015

(54) DATA COMMUNICATION IN OPENFLOW NETWORKS

(75) Inventors: Sampath Rangaprasad, Karnataka (IN); Devarajan Venkatavaradhan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 13/456,292

(22) Filed: Apr. 26, 2012

(65) Prior Publication Data

US 2013/0286824 A1     Oct. 31, 2013

(51) Int. Cl.
*H04L 12/721*     (2013.01)
*H04L 12/26*     (2006.01)

(52) U.S. Cl.
CPC ............. *H04L 43/026* (2013.01); *H04L 45/38* (2013.01); *Y02B 60/33* (2013.01)

(58) Field of Classification Search
USPC ......... 370/216, 217, 219, 230, 235, 244, 252, 370/392, 400, 409, 410; 709/220, 223, 224
See application file for complete search history.

(56) References Cited

U.S. PATENT DOCUMENTS

| | | | |
|---|---|---|---|
| 6,651,101 B1 | 11/2003 | Gai et al. | |
| 2009/0138577 A1* | 5/2009 | Casado et al. | 709/220 |
| 2010/0217936 A1 | 8/2010 | Carmichael et al. | |
| 2011/0228682 A1* | 9/2011 | Enomoto et al. | 370/244 |
| 2011/0261688 A1 | 10/2011 | Sharma et al. | |
| 2011/0261825 A1* | 10/2011 | Ichino | 370/400 |
| 2011/0286324 A1* | 11/2011 | Bellagamba et al. | 370/219 |
| 2011/0305168 A1* | 12/2011 | Koide | 370/255 |
| 2012/0275328 A1* | 11/2012 | Iwata et al. | 370/252 |

* cited by examiner

*Primary Examiner* — Awet Haile
(74) *Attorney, Agent, or Firm* — Van Cott, Bagley, Cornwall & McCarthy (57) ABSTRACT

Systems and methods for data communication in OpenFlow networks are described. At least one system state condition corresponding to at least one flow matching condition is provided to a network device. The at least one system state condition is related to a state of at least one state attribute of the network device. The at least one system state condition is provided for forwarding a packet from the network device.

20 Claims, 9 Drawing Sheets

DATA COMMUNICATION IN OPENFLOW NETWORKS

BACKGROUND

Computer networks are vastly utilized and relied upon across the globe to transfer or share information between two or more places. Computer networks are used by users for a variety of purposes, including communications via emails, chats, tele-calls, video conferencing; and access of data and resources from one or more computers on the computer networks. The need of transferring or sharing information via computer networks has increased many folds. Thus, it is important to have computer networks that are capable of high performance, are easy to configure and involve low implementation costs.

A computer network, also referred to as a network, typically involves one or more network devices, such as network switches and network routers, apart from other components, for the purpose of transferring of information between two or more end users. The information is transferred in the form of digitized data packets, simply referred to as packets. At a network device, packets are received at one or more input ports of the network device and are forwarded to one or more output ports of the network device. The forwarding is based on the path or the route of the packet, for being forwarded to an end user, which may in turn be based on the configuration of the network.

Typically, each network device in a network is configured with an in-built control logic, also referred to as the control plane. The control logic determines forwarding rules or conditions that allow the network device to control the forwarding behavior or flow of packets between the input and output port(s) of the network device. Although, such network devices with the control logic are capable of determining the forwarding rules or conditions, their functioning is complicated and configuration is complex. In addition, such network devices are costly, which increases the overall cost of the network.

The above mentioned problems involved in typical network devices, such as network switches, are solved with the advent of OpenFlow technology. In an OpenFlow network, the control logic is not a part of the network device but resides on an external device, such as a controller, on the network. The controller communicates information related to forwarding rules based on packet headers of packets to the network device. The flow of packets, through the network device for further transferring, is controlled based on the forwarding rules. Typically, a single controller can operate to communicate information related to forwarding rules to one or more network devices. Thus, with the OpenFlow technology, the functioning and the configuration of network devices become simpler, troubleshooting a network device issue becomes easier, and the cost of the network devices gets reduced, which makes the implementation of the computer network cost effective.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

The present subject matter relates to systems and methods for data communication in OpenFlow networks.

A typical OpenFlow network comprises an OpenFlow controller, hereinafter referred to as the controller, communicatively coupled to one or more network devices, such as switches. The network devices may be coupled to each other depending upon the network configuration. As mentioned earlier, in the OpenFlow network, the controller provides the control logic to each of the network devices, based on which the route for the packets in the network is decided for being transferred to another network device or an end user.

The controller, typically, sends instructions in the form of one or more flow entries, to each of the network devices. Each flow entry constitutes fields related to a flow matching condition and an action to be performed at the network device. The flow matching condition field, typically, includes sub-fields, such as source and destination Internet Protocol (IP) addresses, source and destination Media Access Control (MAC) addresses, source and destination port numbers, a type value, IP number, Virtual Local Area Network (VLAN) number, and so on. Some of the mentioned sub-fields correspond to sub-fields of a packet header of the packet received by a network device. Further, the action field, typically, includes a predefined action rule, which is executed at the network device for the purpose of forwarding the packet. The flow entries sent by the controller are saved in a flow table at the network device.

Typically, in an OpenFlow network communication, as a packet received at an input port of a network device may be from another network device or an end user, the flow table is looked-up and the packet header of the packet is compared with the flow matching condition of the flow entries in the flow table. Depending upon the result of the comparison, either the action associated with the matched flow entry is executed to forward the packet to an output port of the network device, or the packet is dropped or forwarded to the controller, in a conventionally known manner.

To illustrate with an example, a network device, such as a switch, may include three input and output ports. The controller may send, to the switch, a flow entry comprising the flow matching condition field with sub-fields: 'Input Port=1' and 'Destination IP=10.0.0.1'; and the action field with an action rule: 'Output Port=2'. With such a flow entry, the packets received by the switch from input port 1 and having destination IP attribute in the packet header as 10.0.0.1 shall be forwarded to the output port 2 for further transferring of the packet to another switch or an end user. The above example is illustrated for explanatory purposes and, for the sake of simplicity, only one example is described as other examples may be known to a person having ordinary skills in the art.

In a conventional OpenFlow network and communication methodology, in case the output port to which the packet to be forwarded based on the flow entry is down, for example, if that output port has been rendered malfunctional; the controller is notified of such events by the network device. Based on such a notification, the controller sends an updated flow entry with a revised action field according to the availability of another output port, such that the packet can be re-forwarded to that output port. With this methodology, the conventional OpenFlow network, in such situations, experiences latency in forwarding the packet. The latency is substantially equivalent to the time taken by the network device to notify the controller and by the controller to send the updated flow entry back to the network device, which may be equal to at least one round-trip-time (RTT). The RTT, herein, may be understood as the time taken by a message to flow from the network device to the controller and back. During the latency period, the network device could be regarded as non-functional. This can affect the flow of packets at the network device as packets may get dropped during this period. The latency and the consequent packet loss may adversely affect the performance of the network.

Conventionally, the latency in the OpenFlow communication, as described above, can be reduced by directly connecting the controller to the network device, such as switches, in the OpenFlow network. With this, the time taken to communicate with the controller and receive the updated flow entry can be lowered, but not substantially. Further, conventionally, the latency in the OpenFlow communication can be substantially reduced by embedding the controller within the network device itself. With this, the time taken for sending and receiving messages to and from the controller can be made insignificant. However, in such a case, a controller has to be embedded within each of the network devices. This may make the configuration of the network device complex and costly.

Systems and methods related to data communication in OpenFlow networks are described herein. With the systems and methods of the present subject matter the problems related to latency in the conventional OpenFlow networks and OpenFlow communication methods, as described above, can be overcome in an efficient manner.

The system, in accordance with an embodiment of the present subject matter, comprises a controller and one or more network devices, such as switches, communicatively coupled to the controller. In an implementation, one or more system state conditions are provided to at least one of the network devices, along with one or more flow matching conditions and corresponding action rules for the purpose of forwarding of packets from the network device. The flow matching conditions are related to packet headers of packets being received at the network device and the corresponding action rules are indicative of actions to be performed on the packets in regard with forwarding of the packets from the network device. Each of the system state conditions provided to the network device may be indicative of a state of at least one state attribute of the network device, based on which the packets are forwarded from the network device. The state attributes and their states in the system state conditions may be those which may influence the forwarding of packets from the network device. The state attribute and its state in the system state condition may be indicative of port availability, port bandwidth utilization, VLAN availability, processor (CPU) utilization, memory utilization, power consumed, flow table size supported, flow table size available and such.

In an implementation, for the purpose of forwarding of a packet from a network device, the at least one system state condition may be checked in the network device along with the comparison of the packet header of the packet with the flow matching conditions. If one of the flow matching conditions matches with the packet header and the at least one system state condition is true, then the packet is forwarded in accordance with the action rule corresponding to the matched flow matching condition and the true system state condition. It may be understood that a system state condition is true when an actual state, in real-time, of the state attribute of network device matches with the state of the state attribute as indicated in the system state condition.

To illustrate with examples, consider a switch as a network device having two input and output ports. In an implementation, two system state conditions along with a flow matching condition and corresponding action rules may be provided to the switch. The first system state condition and the corresponding action rule may indicate that if the first port is up then the packet may be forwarded to the first port, and the second system state condition and the corresponding action rule may indicate that if the first port is down and the second port is up then the packet may be forwarded to the second port. In another implementation, the second system state condition and the corresponding action rule may indicate that if the bandwidth of first port is utilized by more than 70% then the packet may be forwarded to the second port. The above examples are illustrated for explanatory purposes and should not be construed as a limitation. Other examples related to the system state conditions and actions are described in detail later in the description.

In an implementation, the at least one system state condition may be provided to a network device by the controller of the system of the present subject matter. The system state condition may be provided based on OpenFlow protocol and through a secure communication channel between the controller and the network device. In another implementation, the at least one system state condition may be provided to a network device by a network entity, such as a network management station, through an Out-of-Band channel.

The at least one system state condition may be provided to the network devices in various different ways. In an implementation, the system state condition may be provided to the network device in the form of a type-length-value (TLV) message. Such a message may be referred to as a system state TLV message. The system state TLV message may comprise type, length and value sub-fields having data associated with the type and the identity of the at least one state attribute of the network device, and the state of the mentioned state attribute(s) for the purpose of forwarding of the packets. The length sub-field may have data associated with a length of the value sub-field.

Further, more than one system state TLV messages may be appended together to form a system state condition. As multiple system state TLV messages can be appended together, a field with an end condition may be appended at the end of the system state TLV messages to indicate an end of the system state condition, particularly an occurrence of the last system state TLV message. This allows the network device to identify the end of the system state conditions and accordingly stop the checking for the system state conditions and proceed to execute the corresponding action.

In an implementation, the forwarding of packets may include forwarding of the packets to an output port of the network device or dropping of the packets from the network device. Also, in an implementation, the system state conditions may be such that the packet can be forwarded to an alternate output port of the network device or may be dropped for various reasons, such as if the output port to which the packet was actually supposed to be sent is malfunctioning or utilized, VLAN is down, CPU is utilized or memory is utilized. The provision of the least one system state condition and its checking allows the network device to decide on forwarding of packets in case of a malfunctioning or an overloading, and the network device need not inform or rely on the controller to update the network device with the revised action rule for the purpose of forwarding the packet. Thus, with the systems and methods of the present subject matter, for data communication in OpenFlow networks, the problem of latency mentioned in the conventional OpenFlow network can be substantially eliminated. This elimination of latency makes the communication of packets substantially efficient, as the RTT, which may be in a range from a few tens of milliseconds to a few seconds, can be saved.

The above systems and methods are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

The manner in which the systems and methods for data communication in OpenFlow networks are implemented shall be explained in details with respect to FIGS. 1 to 8. While aspects of described systems and methods for data communication in OpenFlow networks can be implemented in any number of different computing systems, environments, and/or configurations, the embodiments are described in the context of the following exemplary system(s).

It will also be appreciated by those skilled in the art that the words 'during', 'while', 'when', and 'upon' as used herein are not exact terms that mean as action takes place instantly upon an initiating action but that there may be some small but reasonable delay, such as propagation delay, between the initial action and the reaction that is initiated by the initial action. Additionally, the word 'coupled' is used throughout for clarity of the description and can include either a direct coupling or an indirect coupling.

Figure 1:
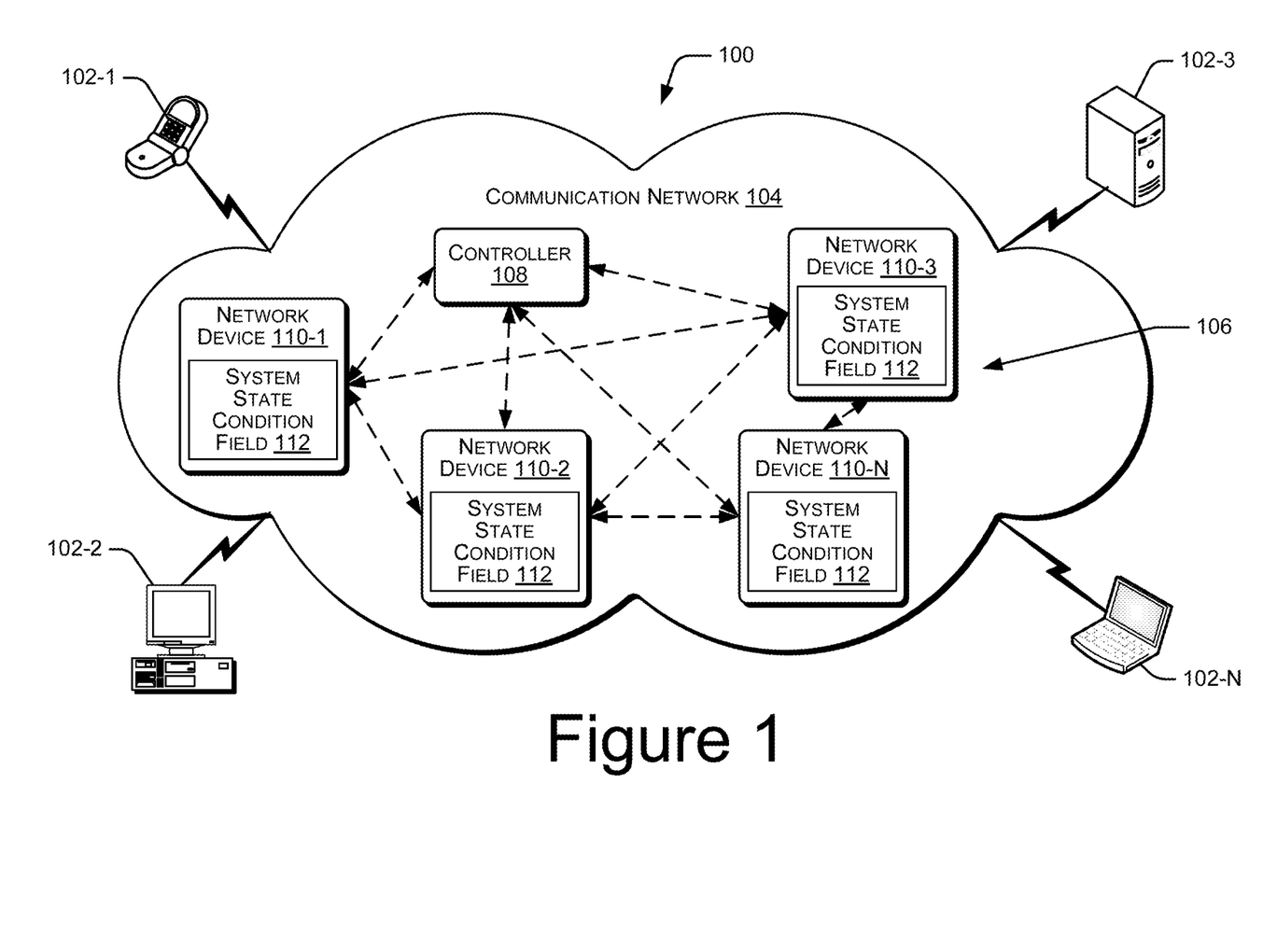
FIG. 1 schematically illustrates a network system implemented for communication of data in a communication network, according to an embodiment of the present subject matter.

FIG. 1 schematically illustrates a network system 100 implemented for communication of data between a plurality of host devices 102-1, 102-2, 102-3, . . . , 102-N, collectively referred to as host devices 102 and individually referred to as a host device 102, according to an embodiment of the present subject matter. The host devices 102 may include devices that allow for transmission and reception of data to and from other host devices. The host devices 102 may include, but are not limited to, mobile phones, smart phones, PDAs, tablets, desktop computers, laptops, servers, mainframe computers, and the like, belonging to an end user, such as an individual, a service provider, an organization or an enterprise. The network system 100 may be understood as a public or a private network system implementing a communication network 104 over which the host devices 102 may communicate with each other. In an implementation, the communication network 104 is configured to function based on OpenFlow communication methodology for communication of data and thus, may be understood as an OpenFlow network.

The communication network 104 may be implemented as a wireless network or a wired network, or a combination thereof. The communication network 104 can be an individual network or a collection of many such individual networks, interconnected with each other and functioning as a single large network, e.g., the Internet or an intranet. The communication network 104 can be implemented as one of the different types of networks, such as local area network (LAN), wide area network (WAN), and such. The communication network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. The communication network 104 may also include individual networks, such as, but are not limited to, GSM network, UMTS network, LTE network, PCS network, TDMA network, CDMA network, NGN, PSTN, and ISDN. The host devices 102 work on communication protocols that are compatible with the communication network 104 to which the host devices 102 are coupled.

The communication network 104 implements a communication system 106 having at least one network controller 108 and one or more network devices 110-1, 110-2, 110-3, . . . , 110-N for establishing communication links between the host devices 102 for the purpose of transferring of packets between the host devices 102. The network controller 108, hereinafter, is referred to as a controller 108 for the sake of simplicity, and the network devices 110-1, 110-2, 110-3, . . . , 110-N, hereinafter, are collectively referred to as network devices 110 and individually referred to as a network device 110. As mentioned earlier, since the communication network 104 is configured to function based on OpenFlow communication methodology, the controller 108 and the network devices 110 may be understood as an OpenFlow controller and OpenFlow network devices, respectively. The network devices 110 may include, but are not limited to network switches and network routers. Apart from such network devices 110, the communication system 106 may include network hubs, Host Bus Adaptors (HBAs) and other network entities. The controller 108 is communicatively coupled to the network devices 110 for the purpose of controlling of forwarding behaviour or flow of packets arriving at each of the network device 110. Although, FIG. 1 shows only one controller 108, the communication system 106 may include more than one controller for controlling the flow of packets at the network devices 110. Further, the communication links between the host devices 102 may be enabled through the network devices 110 in a desired form of communication, for example, via dial-up connections, cable links, and digital subscriber lines (DSL), wireless or satellite links, or any other suitable form of communication.

In an implementation, one or more of the network devices 110 are provided with one or more system state conditions by the controller 108 based on which flow or forwarding of one or more packets from the network device 110 in controlled. Each system state condition may be generated and provided by the controller 108 to the network devices 110 in the form of a system state condition field 112. The system state conditions relate to one or more state attributes, and states of the state attributes, of the network device 110 for the purpose of forwarding of packets. The details of forwarding of packets from the network devices 110, in accordance with the present subject matter, are described later in the description.

The succeeding description is explained with reference to controlling of flow of packets in a network switch communicatively coupled to the controller 108, in accordance with the present subject matter, and it will be appreciated by one skilled in the art that the concepts explained in context thereto may be extended to controlling of flow of packets in other network devices, such as network routers, and the like, communicating with the controller 108 in the communication system 106. Thus, for the ease of understanding, the network device 110-1, hereinafter, may be referred to as the 'switch 110'.

Figure 2:
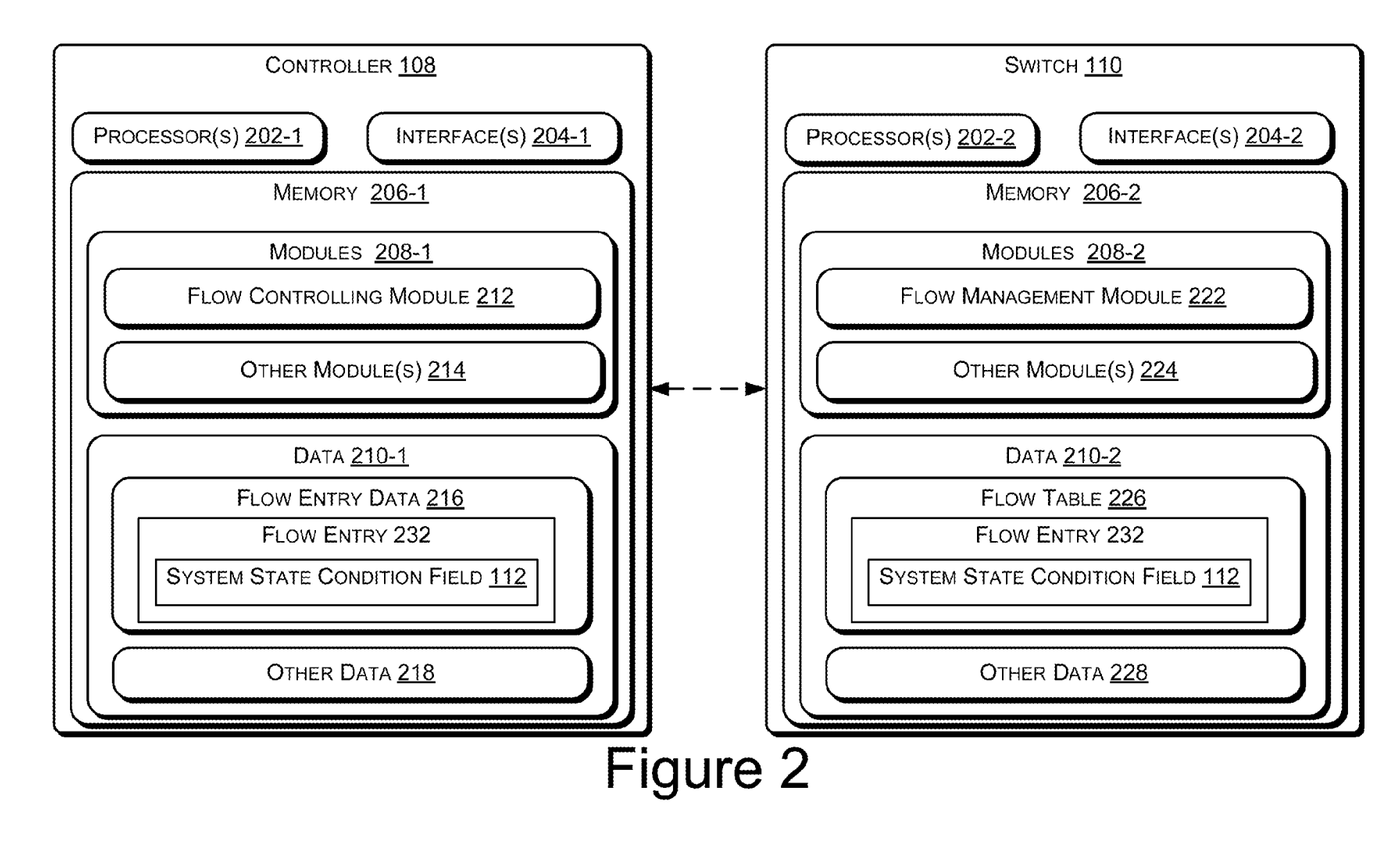
FIG. 2 illustrates a controller and a switch, according to an embodiment of the present subject matter.

FIG. 2 illustrates the controller 108 and the switch 110 according to an embodiment of the present subject matter. In accordance with the aforegoing description, the controller 108 and the switch 110 are communicatively coupled to each other for the purpose of flow of packets from the switch 110 based on an OpenFlow communication methodology. The controller 108 and the switch 110 may be coupled through a secure communication channel and the communication may be based on OpenFlow protocols. For the sake of simplicity, FIG. 2 shows the controller 108 communicating with one switch 110. However, in various implementations, the controllers 108 may communicate with one or more such switches 110. Although various embodiments of the controller 108 as well as the switch 110 are possible, the same have been explained with respect to embodiments depicted in FIG. 2.

The controller 108 and the switch 110 include processors 202-1, 202-2, collectively referred to as processors 202 and individually referred to as a processor 202. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The controller 108 and the switch 110 also include interface(s) 204-1, 204-2, collectively referred to as interfaces 204 and individually referred to as an interface 204. The interfaces 204 may include a variety of software and hardware interfaces that allow the controller 108 and the switch 110 to interact with each other. Further, the interfaces 204 may enable the controller 108 and the switch 110 to communicate with other communication and computing devices, such as host devices 102 and other network entities on the communication network 104. The interfaces 204 may facilitate multiple communications within a wide variety of networks and protocol types, including wire networks, for example, LAN, cable, etc., and wireless networks, for example WLAN, cellular, satellite-based network, etc.

The controller 108 and the switch 110 further include memory 206-1, 206-2, collectively referred to as memory 206, coupled to the processors 202-1, 202-2. The memory 206 may include any computer-readable medium known in the art including, for example, volatile memory (e.g., RAM), and/or non-volatile memory (e.g., EPROM, flash memory, etc.).

The memory 206-1, 206-2 of the controller 108 and the switch 110, respectively, includes modules 208-1, 208-2 and data 210-1, 210-2, collectively referred to as modules 208 and data 210, respectively. The modules 208 include routines, programs, objects, components, data structures, and the like, which perform particular tasks or implement particular abstract data types. The modules 208 further include modules that supplement applications on the controller 108 and the switch 110, for example, modules of an operating system. The data 210 serves, amongst other things, as a repository for storing data that may be fetched, processed, received, or generated by one or more of the modules 208.

In an implementation, the modules 208-1 of the controller 108 includes a flow controlling module 212 and other module(s) 214. In an implementation, the data 210-1 of the controller 108 includes flow entry data 216 and other data 218. The other module(s) 214 may include programs or coded instructions that supplement applications and functions, for example, programs in the operating system of the controller 108, and the other data 218 comprise data corresponding to one or more other module(s) 214.

Similarly, in an implementation, the modules 208-2 of the switch 110 includes a flow management module 222 and other module(s) 224. In an implementation, the data 210-2 of the switch 110 includes flow table 226 and other data 228. The other module(s) 224 may include programs or coded instructions that supplement applications and functions, for example, programs in the operating system of the switch 110, and the other data 228 comprise data corresponding to one or more other module(s) 224.

In an implementation, the flow controlling module 212 of the controller 108 is configured to generate one or more flow matching conditions, the one or more system state conditions corresponding to the each flow matching condition and an action rule corresponding to the each system state condition and each of the flow matching conditions. In addition, in accordance with an implementation, the flow controlling module 212 is configured to provide the flow matching condition, the system state condition and the action rule to the switch 110. As mentioned earlier, the system state conditions relate to the state attributes of the switch 110 and states of the state attribute. The flow matching conditions correspond to the packets being received at the switch 110, and the action rules are indicative of the action related to the forwarding or the flow of packets to be performed at the switch 110.

Figure 3:
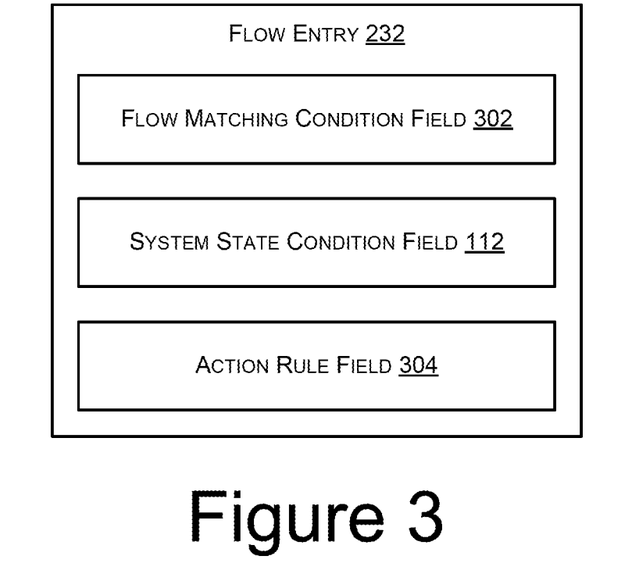
FIG. 3 illustrates a flow entry, according to an embodiment of the present subject matter.

In an implementation, each flow matching condition along with the corresponding system state condition and the corresponding action rule are encoded and generated by the flow controlling module 212 in the form of fields in a flow entry 232. As mentioned earlier, in an example, the system state condition is encoded in the form of the system state condition field 112 in the flow entry 232. Further, one or more such flow entries 232 generated in the controller 108 may be stored in the flow entry data 216 in the controller 108. The fields of the flow entry 232, in accordance with an implementation of the present subject matter, are illustrated in FIG. 3 and are described later in the description.

Further, one or more flow entries 232, generated in the controller 108, in accordance with the present subject matter, are provided to the switch 110 for the purpose of controlling of flow of packets from the switch 110. In an implementation, the flow management module 222 of the switch 110 is configured to receive at least one flow entry 232, from the controller 108, each including one flow matching condition, one or more system state conditions corresponding to the flow matching condition and one or more action rules corresponding to the flow matching condition and the system state condition, as described above. The flow entries 232 may be stored in the flow table 226 in the switch 110.

In an implementation, the switch 110 may receive one or more packets from another switch 110 (or network device 110) in the communication network 104 or a host device 102 coupled to the communication network 104, and forward the packets based on the flow entries 232 in the switch 110. The packets may be received at one or more input ports of the switch 110, which may be part of the interface(s) 204-2 of the switch 110.

The succeeding description is explained with reference to forwarding of one packet from the switch 110 based on the flow entries 232, in accordance with the present subject matter, and it will be appreciated by one skilled in the art that the concepts thereto may be extended to the forwarding of more than one packet from the switch 110 in a similar manner.

Upon the receipt of a packet at the switch 110, the flow management module 222 refers to the flow table 226 and identifies whether the packet header of the packet matches with at least one of the flow matching conditions of the flow entries 232. A flow matching condition is said to be matched if the sub-fields of the packet header match with the sub-fields of the flow matching condition. For the purposes of the description herein, the flow matching condition matching with the packet header may be referred to as a matched flow matching condition. It may be possible that the packet header of the packet matches with none of the flow matching conditions of the flow entries 232 in the flow table 226. In such a situation, the flow management module 222, in an implementation, may communicate the packet to the controller 108 and receive one or more updated flow entries 232 based on the packet header of the packet, such that the switch 110 can forward similar packets in future based on the updated flow entries 232.

Upon identifying the matched flow matching condition, the flow management module 222 identifies whether the system state condition corresponding to the matched flow matching condition is true or not. For this, an actual state of one or more state attributes of the switch 110, corresponding to those mentioned in the system state condition, is checked. A system state condition is said to be true if the state of the state attribute(s) as mentioned in the system state condition matches with the actual state of the corresponding state attributes of the switch 110. For the purposes of the description herein, the system state condition which is true may be referred to as a true system state condition.

In an implementation, the flow management module 222 is configured to check the actual state of the state attributes of the switch 110. The state of the state attributes may be checked in real-time at the time of identification of the true system state condition, or checked prior to the identification of the true system state condition.

Upon identifying the true system state condition, the flow management module 222 performs an action on the packet in accordance with the action rule corresponding to the true system state condition. In an implementation, the action rule may correspond to forwarding of the packet to one of the output ports of the switch 110 as indicated in the action rule, or to dropping of the packet. The output ports may be part of the interface(s) 204-2.

Further, in an implementation, the flow management module 222 of the switch 110 may be configured to generate and send to the controller 108, an encoded message with data indicative of an ability of the switch 110 to support and check the system state conditions. The encoded message may be in the form of a capability flag of a predefined bit-length. In an example, the encoded messages may be of a single bit, with either 0 or 1 as the data. The flow controlling module 212 of the controller 108 may be configured to receive such an encoded message from the switch 110 and decode the encoded message to identify whether the switch 110 is capable of supporting and checking the system state conditions. Based on the identification, the controller 108 may provide the system state conditions or the flow entries 232 with the system state conditions. It may be possible that one or more network devices 110 on the communication network 104 do not support the system state conditions. Such network devices 110 may function based on conventional network protocol, for example, conventional OpenFlow network protocol.

Referring to FIG. 3, the flow entry 232 may include a flow matching condition field 302, a system state condition field 112 and an action rule field 304. The flow entry 232 may be a Flow-Mod message of an OpenFlow specification. In an implementation, the flow matching condition field 302 may include sub-fields, such as source and destination IP addresses, source and destination MAC addresses, source and destination port numbers, a type value, IP number, VLAN number, and so on. The flow matching condition field 302, in an example, may be in the form of 12 tuple field of a conventional flow matching condition. The sub-fields in the flow matching condition field 302 may take values based on the switch 110 and the packet headers of the packets being received at the switch 110. In an implementation, the action rule field 304 may include information that defines the action rules and is indicative of forwarding of the packet to a predefined port number, or dropping of the packet, or the like.

Although, the system state condition field 112 and the flow matching condition field 302 are shown as separate fields in FIG. 3; in an implementation, the system state condition field 112 may be a part of the flow matching condition field 302. The system state condition field 112 may be configured in the form of one or more additional sub-fields in the flow matching condition field 302, in addition to the sub-fields related to the flow matching condition.

Figure 4A:
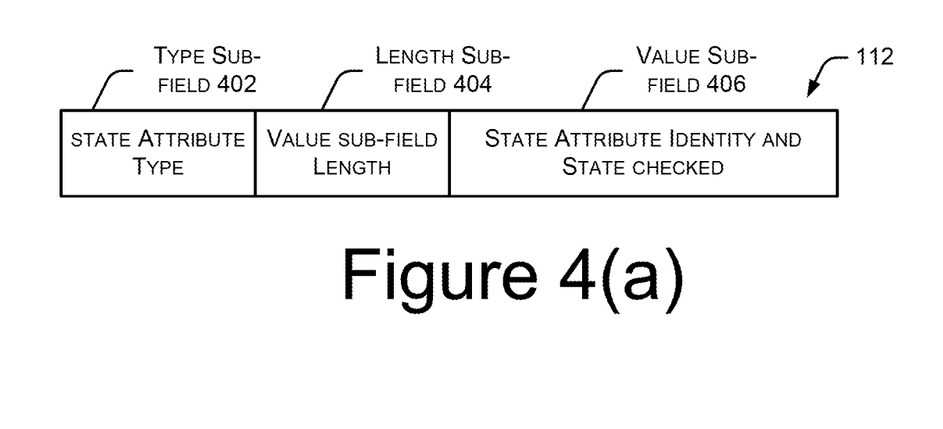
FIG. 4(a) illustrates a system state condition field, according to an embodiment of the present subject matter.

In an implementation, the controller 108 is configured to generate the system state condition field 112, in the flow entry 232, in the form of a system state TLV message. FIG. 4(a) shows the system state TLV message. The system state TLV message may include a type sub-field 402, a length sub-field 404 and a value sub-field 406. The type sub-field 402 may have data indicative of the type of state attribute of the switch 110, which is to be checked at the switch 110 for the purpose of forwarding of the packets. In an implementation, the state attribute of the switch 110 may include, but is not restricted to, port status, port bandwidth status, VLAN status, process utilization status, memory utilization status, power consumed status, flow table size supported status, flow table size available status, and the like. The value sub-field 406 may have data indicative of the identity and the state of the state attribute to be checked at the switch 110, based on which the packets are forwarded from the switch 110. The length sub-field 404 may have data indicative of the length of the value sub-field 406 in the system state condition field 112. Further, each of the type, length and value sub-fields 402, 404, 406 in the system state condition field 112 may be of a predefined bit-lengths, for example, one, two or more bytes, which may take predefined values based on the data to be encoded in the each sub-field 402, 404, and 406.

Figure 4B:
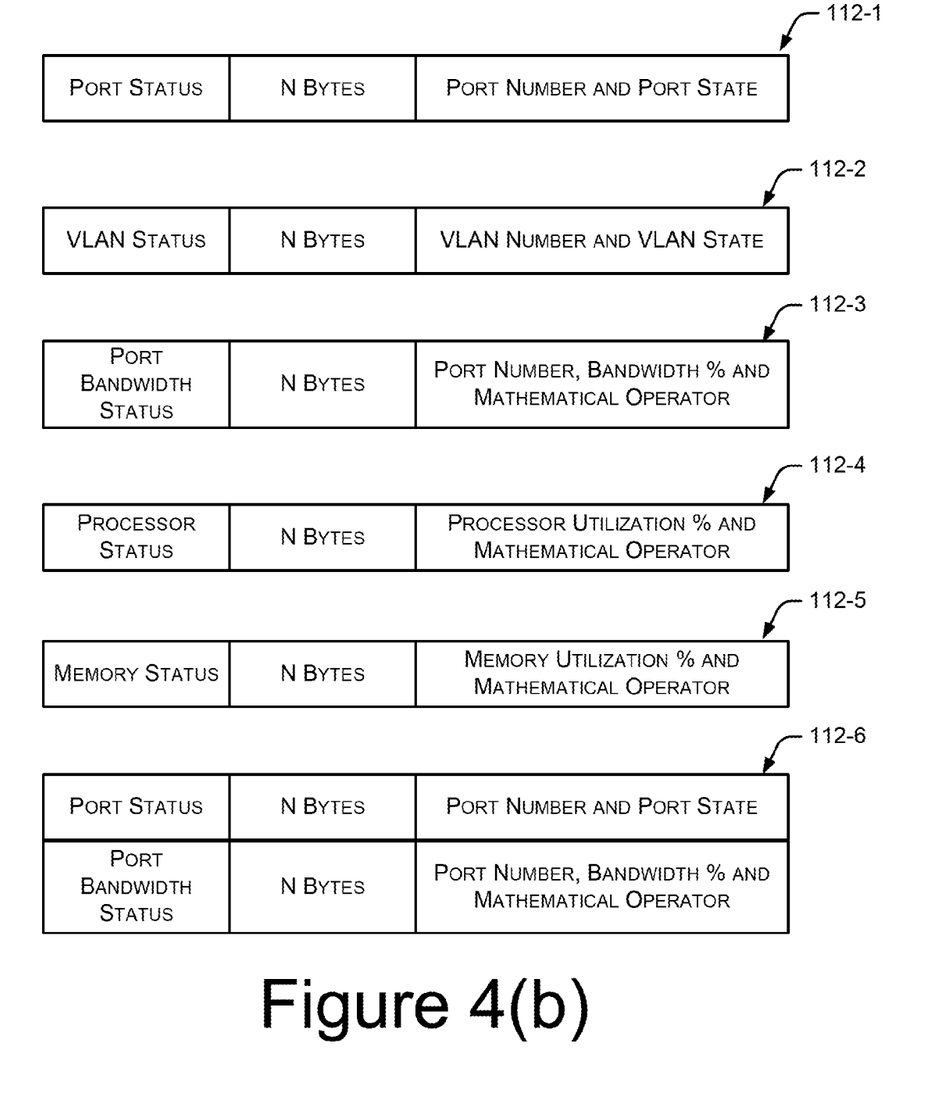
FIG. 4(b) illustrates examples of system state condition fields, according to an embodiment of the present subject matter.

FIG. 4(b) illustrates some examples of system state condition fields 112-1, 112-2, 112-3, 112-4, 112-5, 112-6 in the form of system state TLV messages that may be generated in the flow entry 232 and provided by the controller 108 to the switch 110. Each of the system state condition fields 112-1, 112-2, 112-3, 112-4, 112-5, 112-6 is shown with a type of state attribute in the type sub-field 402, along with the details of information corresponding to the state attribute in the value sub-field 406, and the length of the value sub-fields 406 in the length sub-field 404. The system state condition fields 112-1, 112-2, 112-3, 112-4, 112-5 and 112-6 illustrated in FIG. 4(b) are for the purpose of explanation and are by no means restricted to the examples of the mentioned herein. Other similar system state conditions are possible, as appreciated by the person skilled in the art.

To describe the details, the system state condition field 112-1 includes the type sub-field 402 with data indicative of 'Port Status', the length sub-field 404 with data indicative of the number (N) bytes in which the value sub-field 406 is represented, and the value sub-field 406 with data indicative of port number and port state which is to be checked at the switch 110. In another example, the system state condition field 112-3 includes the type sub-field 402 with data indicative of 'Port Bandwidth', the length sub-field 404 with data indicative of the number (N) bytes in which the value sub-field is represented, and the value sub-field with data indicative of port number, bandwidth in percentage (%) and a mathematical operator, such as equal to, not equal to, less than, greater than, less than equal to or greater than equal to and such. The other system state condition fields 112-2, 112-4, 112-5 and 112-6 can be understood in a similar way. The description of forwarding of packets by the switch 110 based on such system state condition fields is described in detail later in the description.

In an implementation, one system state condition field 112 may include two or more system state TLV messages. The system state condition field 112-6 illustrates an example with two system state TLV messages. Other similar system state conditions are also possible, as appreciated by the person skilled in the art.

With reference to the examples of system state condition fields illustrated in FIG. 4(b), with the system state condition field 112-1 in the flow entry 232, the switch 110 checks the actual state of the port and matches the same with the state of the port mentioned in the value sub-field 406 of the system state condition field 112-1. With the system state condition field 112-2 in the flow entry 232, the switch 110 checks the actual state of the VLAN and matches the same with the state of the VLAN mentioned in the value sub-field 406 of the system state condition field 112-2. Similarly, with the system state condition field 112-3 in the flow entry 232, the switch 110 checks the actual state of the port bandwidth (utilized or available) and checks whether the actual state of the port bandwidth complies with the port bandwidth condition in the value sub-field 406 of the system state condition field 112-3. The actual state of the port bandwidth may be required to be equal to, less than, greater than, less than equal to or greater than equal to the port bandwidth as indicated by the bandwidth % and the operator in the system state condition field 112-3. Further, with the system state condition field 112-6 in the flow entry 232, the switch 110 checks the actual states of both port and port bandwidth and matches the same with the conditions mentioned in the value sub-field 406 of the system state condition field 112-6.

In an implementation, one flow entry 232 may include two or more system state condition fields 112 and action rules fields 304, corresponding to one flow matching condition field 302.

Figure 5A:
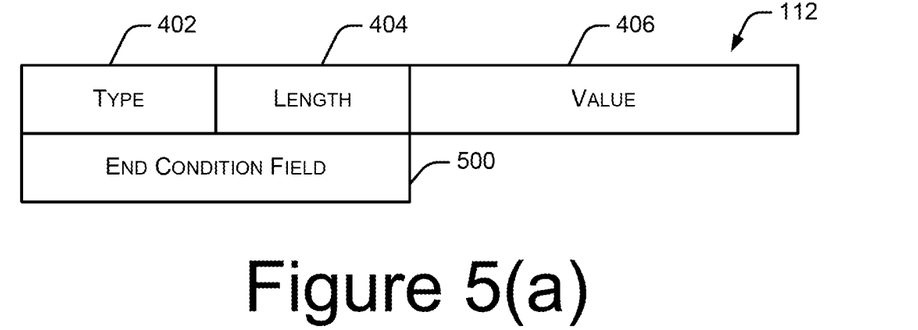
FIG. 5(a) illustrates the system state condition field with an end condition field, according to an embodiment of the present subject matter.

In an implementation, the controller 108 is configured to append an end condition field 500, as illustrated in FIG. 5(a), with each system state condition field 112 in the flow entry 232. The end condition field 500 is indicative of an end of the system state condition and, particularly, an occurrence of the last of the system state TLV messages in the system state condition field 112, such that the switch 110 can identify when to stop the checking of the system state condition and proceed to perform an action on the packet in accordance with the corresponding action rule field 304.

Figure 5B:
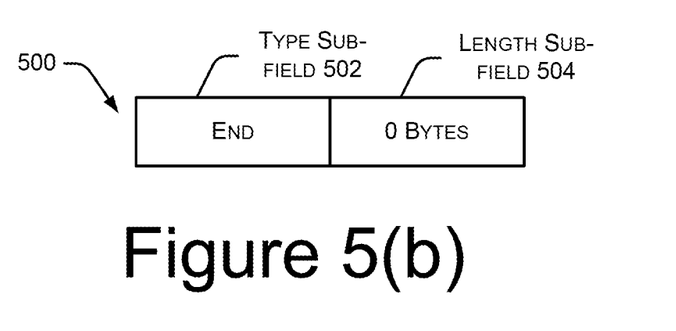
FIG. 5(b) illustrates the end condition field, according to an embodiment of the present subject matter.

In an implementation, the end condition field 500 may be in the form a TLV message, as shown in FIG. 5(b). The end condition field 500 may include a type sub-field 502 with data indicative of the end of the system state condition and a length sub-field 504 with data representing zero bits or bytes. This data in the length sub-field 504 indicates that there is no corresponding value sub-field in the end condition field 500. Further, each of the type and length sub-fields 502, 504 in the end condition field 500 may be of predefined bit-lengths, for example, one, two or more bytes, which may take predefined values based on the data to be encoded in each of the sub-fields 502 and 504.

Further, in an implementation, one or more system state conditions may be generated by the controller 108 such that the packet can be forwarded to at least one of the output ports of the switch 110 even if other output ports are malfunctioning or utilized. In an implementation, the multiple system state conditions may be generated depending on the type of source or destination host devices, such as a personal computer, a smart phone, a server, or the like; the type of packets, for example, Voice-over-IP (VoIP) based packets, audio-video data based packets, or the like; and/or the type of application, such as gaming or banking transaction or such, for which the packet is to be transferred in the communication network 104.

Figure 6A:
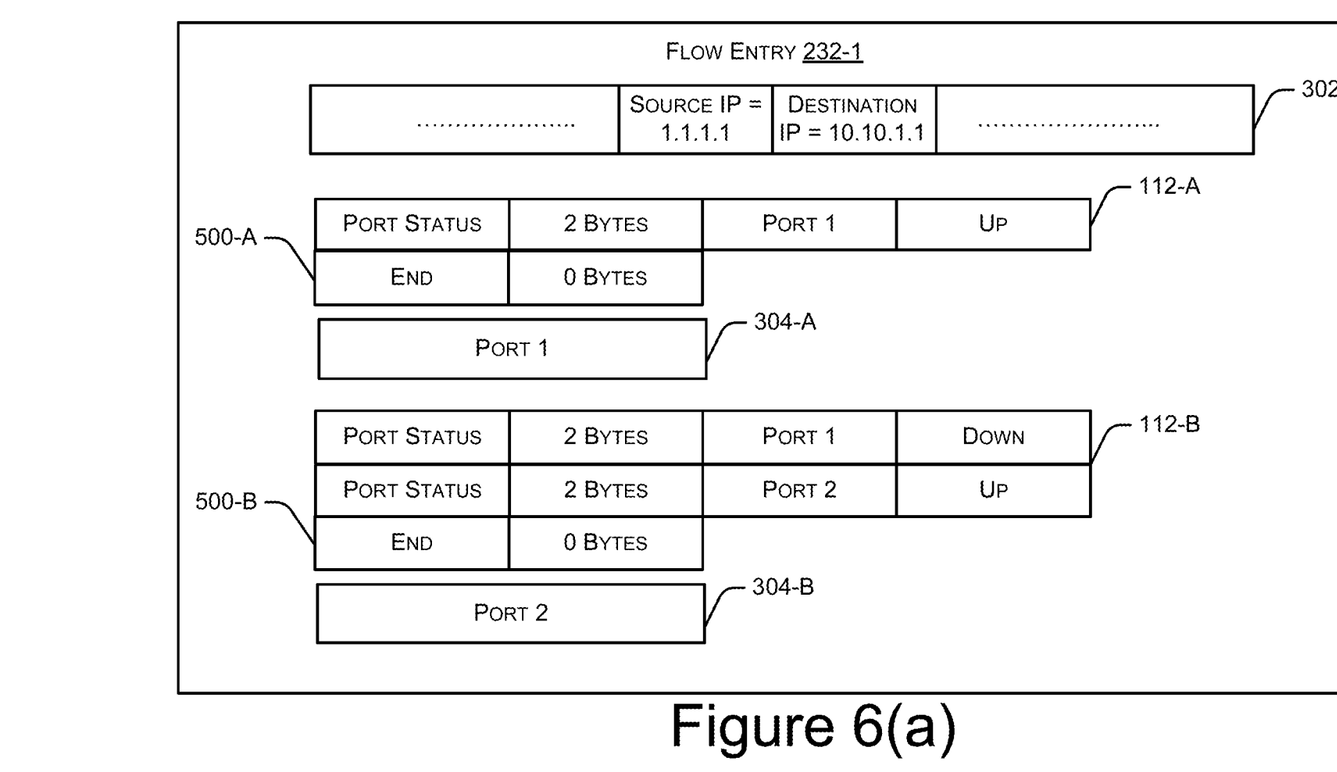
FIG. 6(a) illustrates an example of the flow entry, according to an embodiment of the present subject matter.
Figure 6B:
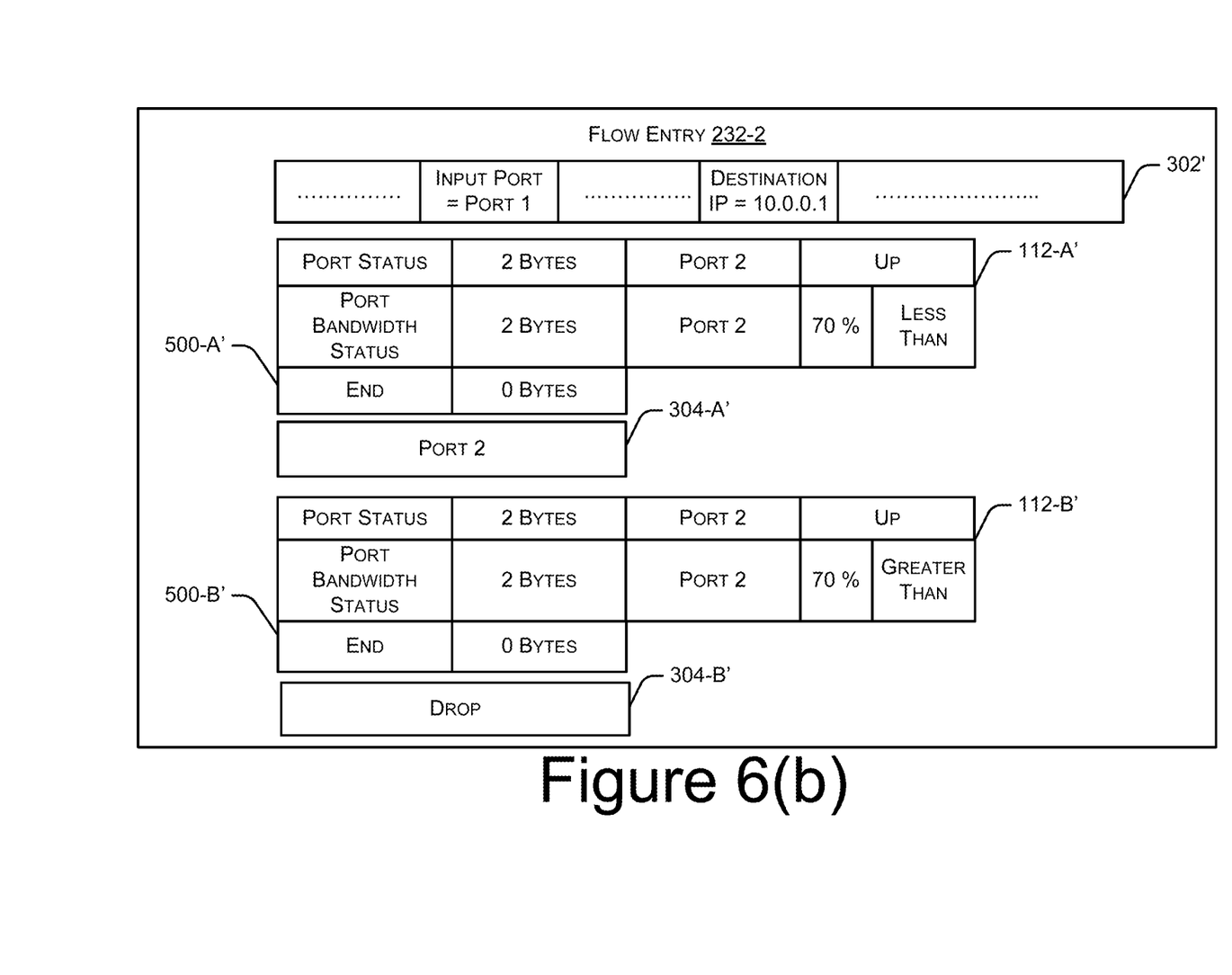
FIG. 6(b) illustrates another example of the flow entry, according to an embodiment of the present subject matter.

FIGS. 6(a) and 6(b) illustrate examples of flow entries 232-1 and 232-2, respectively, in accordance with the present subject matter, which may be sent by the controller 108 to the switch 110. The flow entry 232-1 has a flow matching condition field 302, two system state condition fields 112-A and 112-B and action rule fields 304-A and 304-B corresponding to each of the system state condition fields 112-A and 112-B. The flow matching condition field 302 has, apart from other sub-fields, the Source IP sub-field as 1.1.1.1 and the Destination IP sub-field as 10.10.1.1. The system state condition fields 112-A indicates to the system state condition of Port 1 as UP, and the corresponding action rule field 304-A indicates to forwarding of the packet to Port 1. The system state condition fields 112-B indicates to the system state condition of Port 1 as Down and Port 2 and UP, and the corresponding action rule field 304-B indicates to forwarding of the packet to Port 2. Each of the system state condition fields 112-A and 112-B is appended with the end condition field 500-A, 500-B. The end condition field 500-A, 500-B is indicative of the last state attribute, indicated in the system state condition fields 112-A and 112-B, to be checked. Similarly, the flow entry 232-2 has a flow matching condition field 302', two system state condition fields 112-A' and 112-B' and action rule fields 304-A' and 304-B' corresponding to each of the system state condition fields 112-A' and 112-B'. The flow matching condition field 302' has, apart from other sub-fields, the Input Port sub-field as 1 and the Destination IP sub-field as 10.0.0.1. The system state condition fields 112-A' indicates to the system state condition of Port 2 as UP and port bandwidth utilization of less than 70%, and the corresponding action rule field 304-A' indicates to forwarding of the packet to Port 2. The system state condition fields 112-B' indicates to the system state condition of Port 2 as UP and port bandwidth utilization of more than 70%, and the corresponding action rule field 304-B' indicates to dropping of the packet. Each of the system state condition fields 112-A and 112-B is appended with the end condition field 500-A', 500-B'. The sub-fields of the fields 302, 302', 112-A, 112-A', 112-B, 112-B', 304-A, 304-A', 304-B and 304-B' may have data, for example, in a digital format, corresponding to the details shown in FIGS. 6(a) and 6(b). Further, the flow entries 232-1, 232-2 and the fields 302, 302', 112-A, 112-A', 112-B, 112-B', 304-A, 304-A', 304-B and 304-B', illustrated in FIGS. 6(a) and 6(b), are for the purpose of explanation and are by no means restricted to the examples of the mentioned herein. Other flow entries are possible, as appreciated by the person skilled in the art.

The description below explains the forwarding of a packet from the switch 110 using the examples of flow entries 232-1 and 232-2 shown in FIGS. 6(a) and 6(b), respectively, in accordance with the present subject matter.

In an example, with the flow entry 232-1 in the flow table 226 of the switch 110, a packet header of an incoming packet is compared with the flow matching condition field 302. In an example, if the packet header has, apart from other sub-fields, the Source IP sub-field as 1.1.1.1 and the Destination IP sub-field as 10.10.1.1, the packet header is matched with the flow matching condition field 302. For the matched packet header, the system state conditions in the system state condition fields 112-A, 112-B are checked. As indicated in the system state condition field 112-A, the actual state of Port 1 of the switch 110 is checked and matched with the port state indicated in the system state condition field 112-A. If the actual state of Port 1 is UP, then the packet is forwarded to Port 1 of the switch 110, as indicated in the corresponding action rule field 304-A, for further transferring the packet to another network device 110 or a host device 102. However, if the actual state of Port 1 is Down, then the system state condition field 112-A is not true, and the actual state of Port 2 is checked and matched with the port state indicated in the system state condition field 112-B. If the actual state of Port 2 is UP, then the packet is forwarded to Port 2 of the switch 110, as indicated in the corresponding action rule field 304-B, for further transferring.

In another example, with the flow entry 232-2 in the flow table 226 of the switch 110, a packet header of an incoming packet is compared with the flow matching condition field 302'. In an example, if the packet header has, apart from other sub-fields, the Input Port sub-field as Port 1 and the Destination IP sub-field as 10.0.0.1, then the packet header is matched with the flow matching condition field 302'. For the matched packet header, the system state conditions in the system state condition fields 112-A', 112-B' are checked. As indicated in the system state condition field 112-A', the actual state of Port 2 of the switch 110 and the utilized bandwidth of Port 2 are checked and matched with the port state and utilized bandwidth % indicated in the system state condition field 112-A'. If the actual state of Port 2 is UP and the actual utilized bandwidth of Port 2 is below 70%, then the packet is forwarded to Port 2 of the switch 110, as indicated in the corresponding action rule field 304-A', for further transferring the packet to another network device 110 or a host device 102. However, if the actual state of Port 2 is UP and the actual utilized bandwidth is greater than 70%, then the system state condition field 112-B' is true and the packet is dropped, as indicated in the corresponding action rule field 304-B', without further transferring.

In an implementation, for the flow entries 232 with multiple system state condition fields 112, the controller 108 may generate an encoded message with priority data for setting a predefined order for checking of the system state condition fields 112. The encoded message with the priority data may be sent along with the flow entry 232, and may be a part of the flow entry 232, sent to the switch 110. At the switch 110, with such flow entries 232, the encoded message with priority data is decoded and the system state condition fields 112 are checked in accordance with the priority data. This allows the switch 110 to check for the true system state condition fields in a predefined order. In an implementation, the priority data may be based on the type of source or destination host devices, such as a personal computer, a smart phone, a server, or the like; the type of packets, for example, Voice-over-IP (VoIP) based packets, audio-video data based packets, or the like; and/or the type of application, such as gaming or banking transaction or such, for which the packet is to be transferred in the communication network 104.

Although, the aforementioned description is described in reference to the controller 108 and the switch 110; however, in an implementation, the one or more system state conditions may be provided to the switch 110 by a network management station of the communication network 106. In one embodiment the network management station may be a network entity to which all the switches 110 (or the network devices 110) are communicatively coupled. Each of the system state conditions may correspond to a flow matching condition and an action rule provided to the switch 110 by the controller 108. For example, the switch 110 may receive the one or more system state conditions from the network management station and may store the one or more system state conditions in the flow table 226 along with the corresponding flow matching condition and the corresponding action rule. In said implementation, the network management station may also be configured to append the end condition with each system state condition, as described earlier. Further, in said implementation, the switch 110 may be configured to generate and send to the network management station, an encoded message with data indicative of an ability of the switch 110 to support and check the system state conditions. The network management station may accordingly provide the one or more system state conditions to the switch 110.

Figure 7:
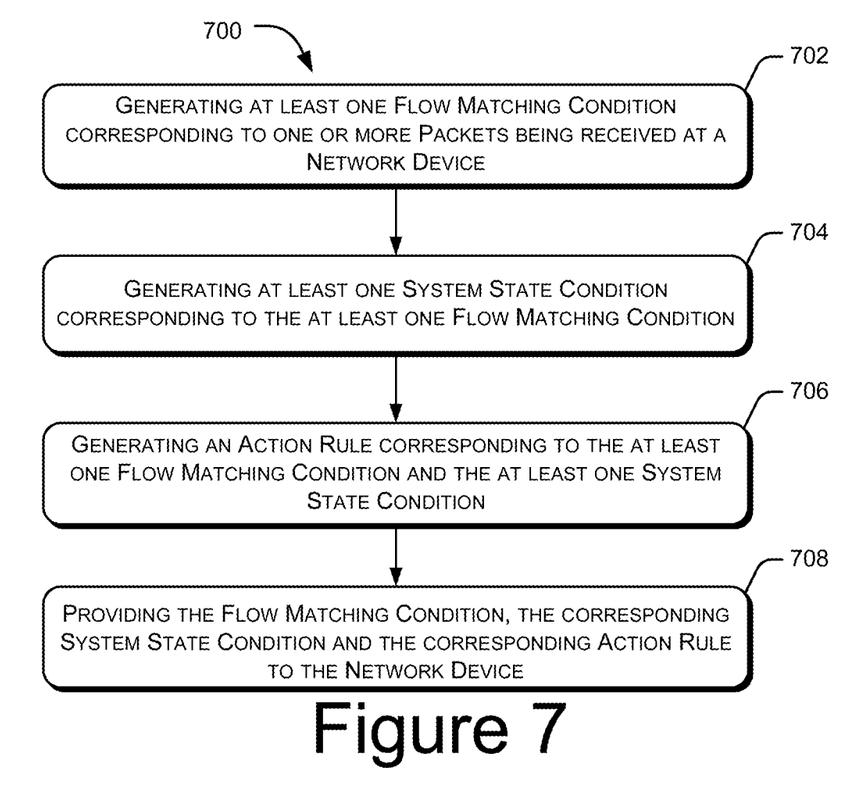
FIG. 7 illustrates a method for data communication in a communication network, in accordance with an embodiment of the present subject matter.
Figure 8:
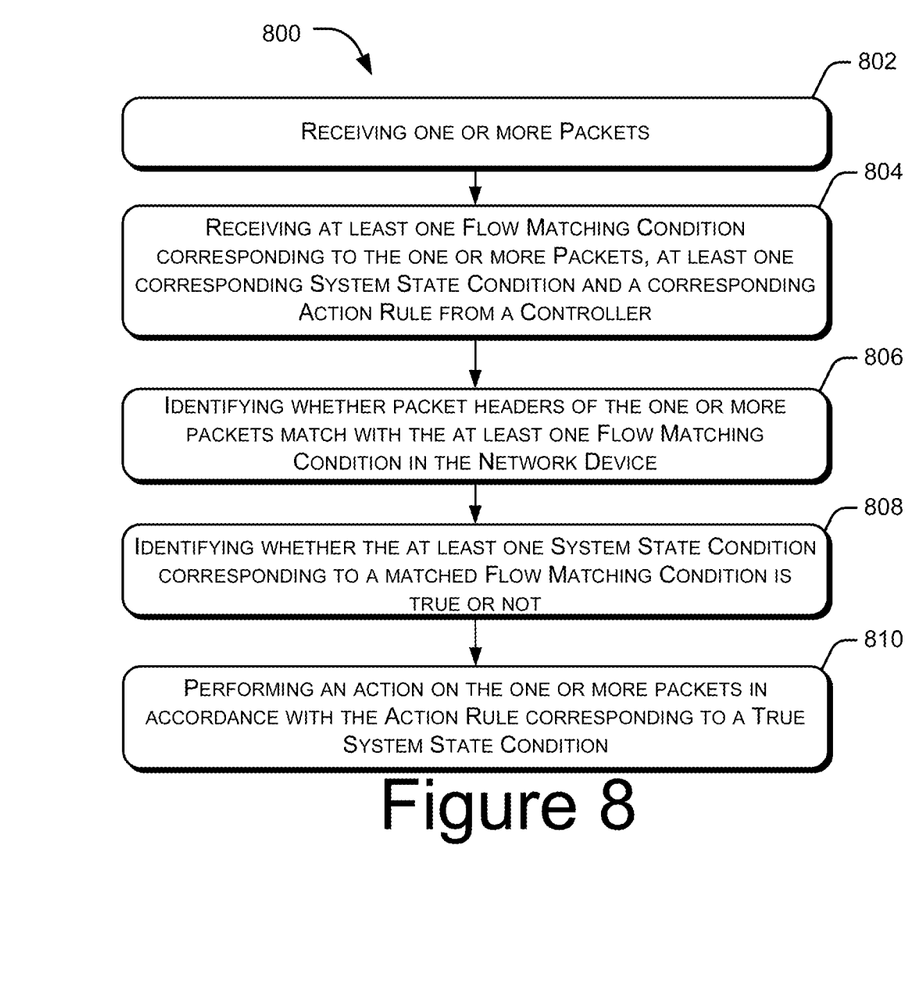
FIG. 8 illustrates a method for data communication in a communication network, in accordance with an embodiment of the present subject matter.

FIG. 7 and FIG. 8 illustrate methods 700 and 800 for data communication in a communication network 104, in accordance with an embodiment of the present subject matter. The order in which the methods 700 and 800 are described is not intended to be construed as a limitation, and any number of the described method blocks can be combined in any order to implement the methods 700 and 800, or an alternative method. Additionally, individual blocks may be deleted from the methods 700 and 800 without departing from the spirit and scope of the subject matter described herein. Furthermore, the methods 700 and 800 can be implemented in any suitable hardware, software, firmware, or combination thereof.

A person skilled in the art will readily recognize that steps of the methods 700 and 800 can be performed by programmed computing devices. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication system configured to perform said steps of the exemplary method.

Further, although the methods 700 and 800 for data communication may be implemented in a variety of communication systems working in different communication network environments, in embodiments described in FIG. 7 and FIG. 8, the methods 700 and 800 are explained in context of the aforementioned communication system 106 including the controller 108 and one or more network devices 110, such as the switch 110, for the ease of explanation.

Referring to FIG. 7, in an implementation, at block 702, at least one flow matching condition is generated by the controller 108. The at least one flow matching condition may be generated corresponding to one or more packets being received at the network device 110.

At block 704, at least one system state condition corresponding to the at least one flow matching condition is generated by the controller 108. As described earlier, the system state condition is related to the state of at least one state attribute of the network device 110, which is to be checked at the network device 110 for the purpose of forwarding of the packet from the network device 110.

In an implementation, the controller 108 may append an end condition with the system state condition. As described earlier, the end condition is indicative of the end of the system state condition and, particularly, an occurrence of the last state attribute to be checked at the network device 110.

In an implementation, the controller 108 may receive, from the network device 110, an encoded message with data indicative of ability of the network device 110 to support and check the system state conditions. The controller 108 may then generate the system state condition based on the ability of the network device 110.

At block 706, an action rule corresponding to the at least one flow matching condition and the at least one system state condition is generated by the controller 108. The action rule is indicative of the action to be performed on the packets at the network device 110 for the purpose of forwarding of packets from the network device 110.

At block 708, the flow matching condition, the corresponding system state condition and the corresponding action rule, generated by the controller 108, are provided to the network device 110. In an implementation, each flow matching condition, the corresponding system state condition and the corresponding action rule are generated in the form of a flow entry 232, which may be provided to the network device 110.

Referring to FIG. 8, in an implementation, at block 802, one or more packets are received by the network device 110. The packets may be received from another network device 110 or a host device 102 on the communication network 104.

At block 804, at least one flow matching condition corresponding to the one or more packets received at the network device 110, at least one system state condition corresponding to the flow matching condition and an action rule corresponding to the flow matching condition and the system state condition are received by the network device 110 from the controller 108. In an implementation, each flow matching condition, the corresponding system state condition and the corresponding action rule may be receive in the form of a flow entry 232 in the flow table 226. Further, in an implementation, such flow entries 232 with one or more system state conditions may be received from the controller 108. The controller 108 may provide the flow entries 232 based on the encoded message, sent by the network device 110, encoded with data indicative of the ability of the network device 110 to support the system state conditions.

At block 806, it is identified whether the packet headers of the one or more packets received at the network device 110 match with the at least one flow matching condition in the network device 110. For the purpose of identification of the matching, the packet headers are compared with the flow matching conditions. The flow matching condition matching with the packet headers of the packets is the matched flow matching condition.

Upon identifying the matched flow matching condition, at block 808, it is identified whether the at least one system state condition corresponding to the matched flow matching condition is true or not. For the purpose of identification of a true system state condition, the actual state of one or more state attributes indicated in the system state condition is checked. The actual state is matched with the state of the state attribute indicated in the system state condition, and if they match, the system state condition is the true system state condition. In an implementation, the actual state of the state attributes of the network device 110 may be checked in real-time.

Upon identifying the true system state condition, at block 810, an action in accordance with the action rule corresponding to the true system state condition is performed on the one or more packets. The action may be to forward the packet to one of the output ports of the network device 110 or to drop the packet or the like.

CONCLUSION

Although implementations for the network system 100 and the communication network 104 have been described in language specific to structural features and/or methods, it is to be understood that the appended claims are not necessarily limited to the specific features or methods described. Rather, the specific features and methods are disclosed as exemplary implementations for data communication in OpenFlow networks.

We claim:
1. A network controller for an OpenFlow network, the network controller comprises:
 a processor; and
 a memory coupled to the processor, the memory comprising a flow controlling module to provide to a network device:
  at least one flow matching condition corresponding to a packet received at the network device;
  at least one system state condition corresponding to the at least one flow matching condition, wherein the at least one system state condition is related to a state of at least one state attribute of the network device; and an action rule corresponding to the at least one flow matching condition and the at least one system state condition, wherein the at least one flow matching condition, the at least one system state condition and the action rule are provided for forwarding of the packet from the network device; and wherein the at least one system state condition is in a form of a type-length-value (TLV) message, wherein the TLV message comprises:
- a type sub-field having data associated with a type of the at least one state attribute of the network device;
- a value sub-field having data associated with at least an identity and a state of the at least one state attribute of the network device; and
- a length sub-field having data associated with a length of the value sub-field.

2. The network controller as claimed in claim 1, wherein the at least one state attribute of the network device comprises one of port status, port bandwidth status, VLAN status, processor utilization status, memory utilization status, power consumed status, flow table size supported status, and flow table size available status.

3. The network controller as claimed in claim 1, wherein the flow controlling module appends an end condition with the at least one system state condition, wherein the end condition is indicative of an end of the system state condition.

4. The network controller as claimed in claim 1, wherein the flow controlling module encodes the at least one system state condition in a Flow-Mod message of an OpenFlow specification.

5. A network device for an OpenFlow network, the network device comprises:
- a processor; and
- a memory coupled to the processor, the memory comprising a flow management module to:
  - receive a packet;
  - identify whether a packet header of the packet matches with at least one flow matching condition;
  - identify whether at least one system state condition, corresponding to the at least one flow matching condition matching with the packet header, is true; and
  - perform an action on the packet to forward the packet from the network device, wherein the action is based on an action rule corresponding to the at least one system state condition,
- wherein the system state condition relates to a state attribute of the network device; and
- wherein the system state condition comprises a type, an identity, and a state of the state attribute of the network device and is received by the network device in the form of a type-length-value (TLV) message.

6. The network device as claimed in claim 5, wherein the flow management module receives:
- at least one flow matching condition field comprising the at least one flow matching condition corresponding to the packet header of the packet;
- at least one system state condition field comprising the at least one system state condition corresponding to the at least one flow matching condition, wherein the at least one system state condition is related to a state of at least one state attribute of the network device; and
- an action-related field comprising the action rule corresponding to the at least one flow matching condition and the at least one system state condition.

7. The network device as claimed in claim 6, wherein the flow management module receives the at least one system state condition field from one of a network controller and a network management station.

8. The network device as claimed in claim 5, wherein the flow management module checks an actual state of at least one state attribute of the network device as indicated in the at least one system state condition.

9. The network device as claimed in claim 5, wherein the flow management module communicates an encoded message to one of a network controller and a network management station, wherein the encoded message comprises data indicative of an ability of the network device to support the at least one system state condition.

10. A method for data communication in an OpenFlow network, the method comprising:
- providing, to a network device, at least one system state condition corresponding to at least one flow matching condition, wherein the at least one system state condition is related to a state of at least one state attribute of the network device,
- providing the at least one flow matching condition corresponding to a packet received at the network device; and
- providing an action rule corresponding to the at least one flow matching condition and the at least one system state condition;
- wherein providing the system state condition, the flow matching condition, and the action rule is for forwarding of a packet from the network device; and
- wherein the system state condition comprises a number of type-length-value (TLV) sub-fields indicating a type, an identity, and a state of the state attribute of the network device.

11. The method as claimed in claim 10, further comprising:
- providing the at least one flow matching condition corresponding to a packet received at the network device; and
- providing an action rule corresponding to the at least one flow matching condition and the at least one system state condition,
- wherein the packet is forwarded from the network device based on identifying whether a packet header of the packet matches with the at least one flow matching condition in the network device, based on identifying whether the at least one system state condition is true in the network device and in accordance with an action indicated in the action rule.

12. The method as claimed in claim 10, wherein the at least one state attribute of the network device comprises one of port status, port bandwidth status, VLAN status, processor utilization status, memory utilization status, power consumed status, flow table size supported status, and flow table size available status.

13. The method as claimed in claim 10, wherein the providing of the at least one system state condition is by one of a network controller and a network management station.

14. A method for data communication in an OpenFlow network, the method comprising:
- receiving a packet by a network device;
- receiving, by the network device, at least one system state condition corresponding to at least one flow matching condition, wherein the at least one system state condition is related to a state of at least one state attribute of the network device;
- receiving, by the network device, the at least one flow matching condition corresponding to a packet header of the packet;

receiving, by the network device, the action rule corresponding to the at least one flow matching condition and the at least one system state condition;

identifying, in the network device, whether the at least one system state condition is true;

identifying, in the network device, whether the packet header of the packet matches with the at least one flow matching condition; and performing an action on the packet in the network device to forward the packet from the network device based on the identifying;

wherein the system state condition may be in the form of a system state type-length-value (TLV) message comprising:

type sub-field comprising data indicative of a type of the at least one state attribute of the network device;

a value sub-field comprising data indicative of the identity and the state of the state attribute; and     a length sub-field having data associated with a length of the value sub-field.

15. The method as claimed in claim 14, further comprising:

receiving, by the network device, the at least one flow matching condition corresponding to a packet header of the packet; and receiving, by the network device, the action rule corresponding to the at least one flow matching condition and the at least one system state condition.

16. The method as claimed in claim 15 wherein the performing the action on the packet is based on the at least one flow matching condition matching with the packet header, the at least one system state condition which is true and the action rule corresponding to the at least one system state condition which is true.

17. The method as claimed in claim 14, wherein the identifying comprises:

checking an actual state of the at least one state attribute of the network device as indicated in the at least one system state condition.

18. A non-transitory computer-readable storage medium storing a set of computer readable instructions, executable by a processor, to:

receive at least one flow matching condition corresponding to a packet received at a network device;

receive at least one system state condition corresponding to the at least one flow matching condition, wherein the at least one system state condition is related to a state of at least one state attribute of the network device;

receive an action rule corresponding to the at least one flow matching condition and the at least one system state condition; and identify whether a packet header of the packet matches with the at least one flow matching condition and whether the at least one system state condition is true for forwarding of the packet from the network device based on the action rule;

wherein the system state condition is in the form of a system state type-length-value (TLV) message comprising type, length and value sub-fields comprising data associated with the type and the identity of the at least one state attribute of the network device, and the state of the mentioned state attribute.

19. The computer-readable storage medium as claimed in claim 18, further to:

check an actual state of the at least one state attribute of the network device as indicated in the at least one system state condition.

20. The network controller of claim 1, wherein a number of additional TLV messages are appended to the TLV message forming a combined TLV message and wherein a field comprising an end condition is appended to the end of the combined TLV message indicating an end of the system state condition.

* * * * *